(12) United States Patent
Falgout et al.

(10) Patent No.: US 10,159,260 B2
(45) Date of Patent: Dec. 25, 2018

(54) SHRIMP CLEANER WITH LINKED ROLLERS

(71) Applicant: Laitram, L.L.C., Harahan, LA (US)

(72) Inventors: Byron M. Falgout, River Ridge, LA (US); Brent A. Ledet, River Ridge, LA (US); Barry C. Strayer, Ponchatoula, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/754,027

(22) PCT Filed: Sep. 1, 2016

(86) PCT No.: PCT/US2016/049834
§ 371 (c)(1),
(2) Date: Feb. 21, 2018

(87) PCT Pub. No.: WO2017/040746
PCT Pub. Date: Mar. 9, 2017

(65) Prior Publication Data
US 2018/0255794 A1 Sep. 13, 2018

Related U.S. Application Data

(60) Provisional application No. 62/213,724, filed on Sep. 3, 2015.

(51) Int. Cl.
*A22C 29/00* (2006.01)
*A22C 29/02* (2006.01)

(52) U.S. Cl.
CPC .................. *A22C 29/021* (2013.01)

(58) Field of Classification Search
CPC ................... A22C 29/00; A22C 29/02; A22C 29/021–29/026
USPC ......................................... 452/2–6
See application file for complete search history.

(56) References Cited

U.S. PATENT DOCUMENTS

| 2,637,065 | A |   | 5/1953  | Lapeyre et al. |
| 3,797,071 | A |   | 3/1974  | Lapeyre |
| 6,017,268 | A | * | 1/2000  | Rosow ................. A22C 29/026 452/5 |
| 7,811,157 | B1 | * | 10/2010 | Wimberly, Jr. ...... A22C 29/026 452/5 |
| 8,574,041 | B1 | * | 11/2013 | Allain ................. A22C 29/028 452/4 |
| 8,616,940 | B2 | * | 12/2013 | Vedsted ................. B08B 3/024 452/5 |

(Continued)

FOREIGN PATENT DOCUMENTS

| CN | 201830827 U | 5/2011 |
| CN | 102365985 A | 3/2012 |
| CN | 102365986 A | 3/2012 |

(Continued)

*Primary Examiner* — Richard T Price, Jr.
(74) *Attorney, Agent, or Firm* — Catherine M. Bishop

(57) ABSTRACT

An improved cleaning device comprises linked rollers that roll over a cleaning surface to remove debris from shrimp or other product. The cleaning device comprises a trough with a cleaning surface, an oscillating shaft within the trough and rollers biased into contact with the cleaning surface. At least some of the rollers are connected through a coupling device, which connects the rollers to the oscillating shaft via a roller connector.

17 Claims, 2 Drawing Sheets

(56) References Cited

U.S. PATENT DOCUMENTS 8,870,632 B2 * 10/2014 Vedsted .................. B08B 3/024
452/5

FOREIGN PATENT DOCUMENTS

| CN | 102365987 A | 3/2012 |
| CN | 102365988 A | 3/2012 |
| CN | 102365989 A | 3/2012 |
| JP | 63-261379 A | 10/1988 |

* cited by examiner

SHRIMP CLEANER WITH LINKED ROLLERS

RELATED APPLICATIONS

The present application claims priority to U.S. Provisional Patent Application Ser. No. 62/213,724, filed Sep. 3, 2015 and entitled "Shrimp Cleaner with Linked Rollers", the contents of which are herein incorporated by reference.

BACKGROUND

The invention relates generally to shellfish processing and more particularly to apparatus and methods for cleaning shrimp.

Peelers are automatic, bulk-fed machines designed specifically to automatically peel raw, shell-on shrimp. The peeling process is designed to preserve the quality, product texture, and pigmentation of the shrimp. After peeling, shrimp enter a cleaning device to detach any remaining shell and separate waste material from edible shrimp meat.

Current designs of cleaning devices, an embodiment 10 of which is shown in FIGS. 1 and 2, employ a trough 20 through which peeled shrimp pass. Legs 21 and other structure support the trough 20, which is preferably oriented at an angle, sloping downwards from a shrimp inlet at a first end 22 to a shrimp outlet at a lower second end 23. An oscillating shaft 11 extends longitudinally through the trough 20. Roller units 12 extend down from the oscillating shaft 11 and include free-wheeling rollers 13 biased into contact with the trough cleaning surface. Each roller unit comprises a post 14 extending down from the oscillating shaft 11, a forked portion 15 for mounting an axle 18 (and associated bearings, washers and other tools) holding the roller 13 between two prongs, and a spring 16 for biasing the forked portion towards the cleaning surface so that the rollers contact the cleaning surface. The ends of the posts 14 may extend up through openings 17 in the oscillating shaft 11. During cleaning, shrimp pass from one end of the trough to a second end of the trough while the oscillating shaft 11 oscillates. A motor 19 or other driver causes the oscillating shaft 11 to oscillate at a desired period and amplitude. The rollers 13 roll over the cleaning surface and pinch the shrimp, detaching any remaining shell or other waste from the meat. Each roller includes a dedicated forked portion 15, and the rollers 13 are independent from each other.

SUMMARY

The present invention provides an improved cleaning trough for cleaning shrimp or other products. The cleaning trough employs an oscillating shaft connected to cleaning rollers, at least some of which are linked together. A roller connector connects a plurality of rollers to the oscillating shaft, so that oscillation of the shaft causes the rollers to roll over the cleaning surface of the trough to clean shrimp or other product passing through the trough.

According to one aspect, a cleaning device comprises a trough extending longitudinally from a first side to a second side and having a cleaning surface, an oscillating shaft extending longitudinally through the shaft above the cleaning surface, a roller connector extending from the oscillating shaft towards the cleaning surface, a coupling shaft connected to the roller connector, a first roller mounted on the coupling shaft and contacting the cleaning surface and a second roller mounted on the coupling shaft and contacting the cleaning surface.

According to another aspect, a cleaning device comprises a trough extending longitudinally from a first side to a second side and having a cleaning surface, an oscillating shaft extending longitudinally above the cleaning surface, a plurality of rollers connected to the oscillating shaft and biased into contact with the cleaning surface, and a plurality of roller connectors extending from the oscillating shaft and connecting the plurality of rollers to the oscillating shaft. The number of roller connectors is less than the number of rollers in the cleaning device.

According to another aspect, a cleaning device comprises a trough extending longitudinally from a first side to a second side and having a cleaning surface, an oscillating shaft extending longitudinally above the bottom of the trough, a first roller coupled to the oscillating shaft and contacting the cleaning surface and a second roller connected to the first roller and contacting the cleaning surface.

BRIEF DESCRIPTION OF THE DRAWINGS

These features and aspects of the invention, as well as its advantages, are described in more detail in the following description, appended claims, and accompanying drawings, in which:

DETAILED DESCRIPTION

The present invention provides an improved cleaning device for shrimp or other objects to be cleaned. The invention will be described relative to certain illustrative embodiments, though those skilled in the art will recognize that the invention is not limited to the illustrative embodiments.

Figure 2:
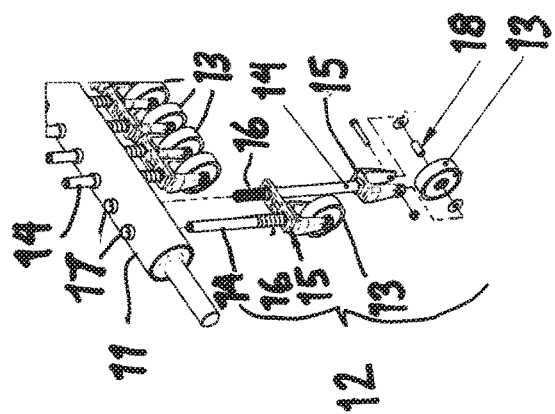
FIG. 2 is a close up and exploded view of roller units in the cleaning trough of FIG. 1.
Figure 1:
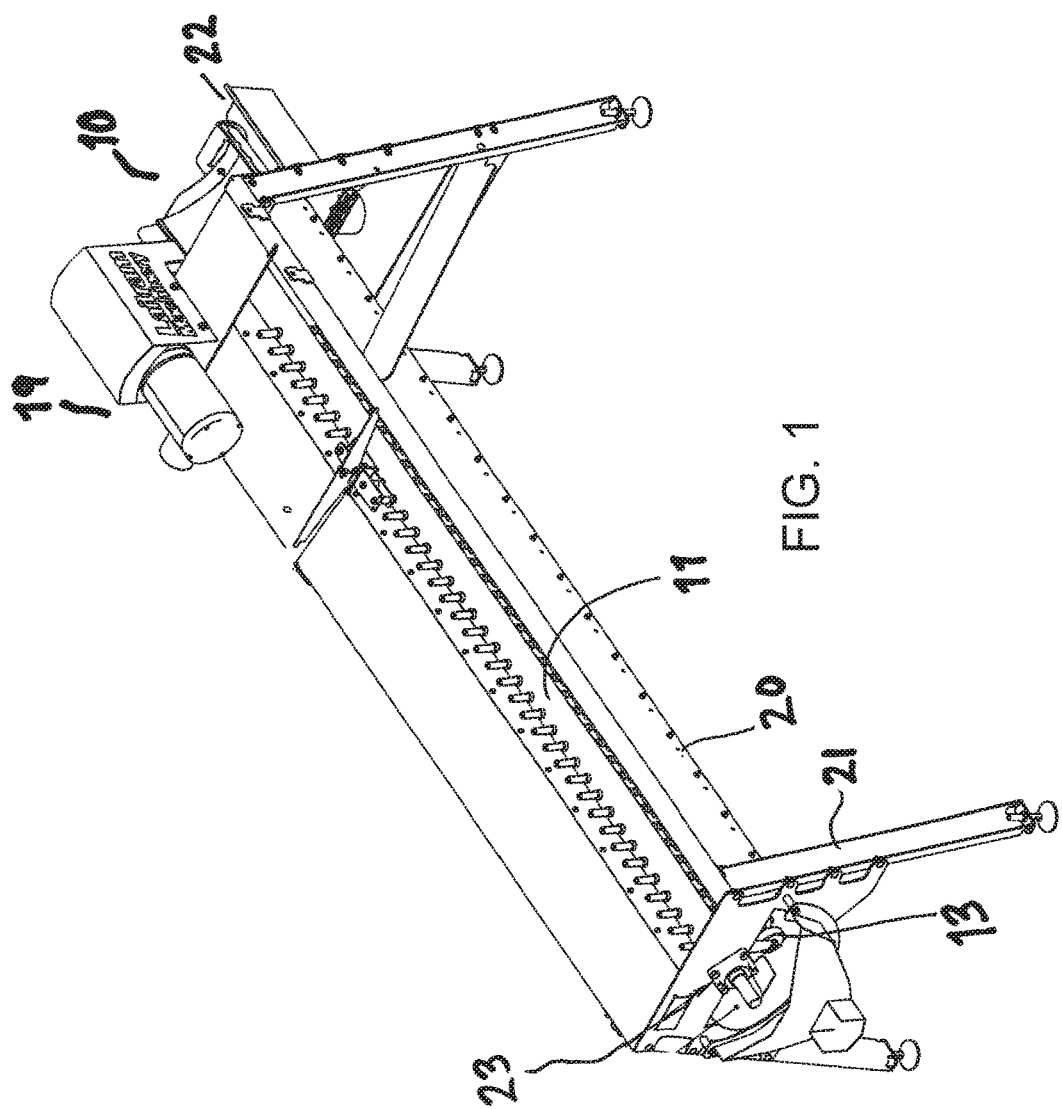
FIG. 1 illustrates a cleaning trough including roller units.
Figure 3A:
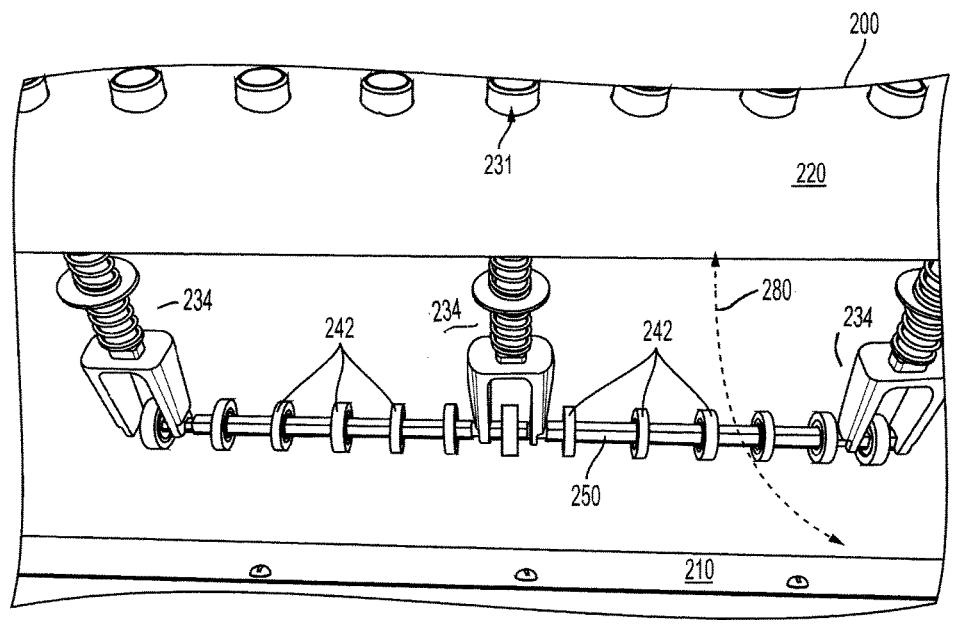
FIG. 3A shows a portion of a cleaning device of an embodiment of the invention comprising linked rollers.
Figure 3B:
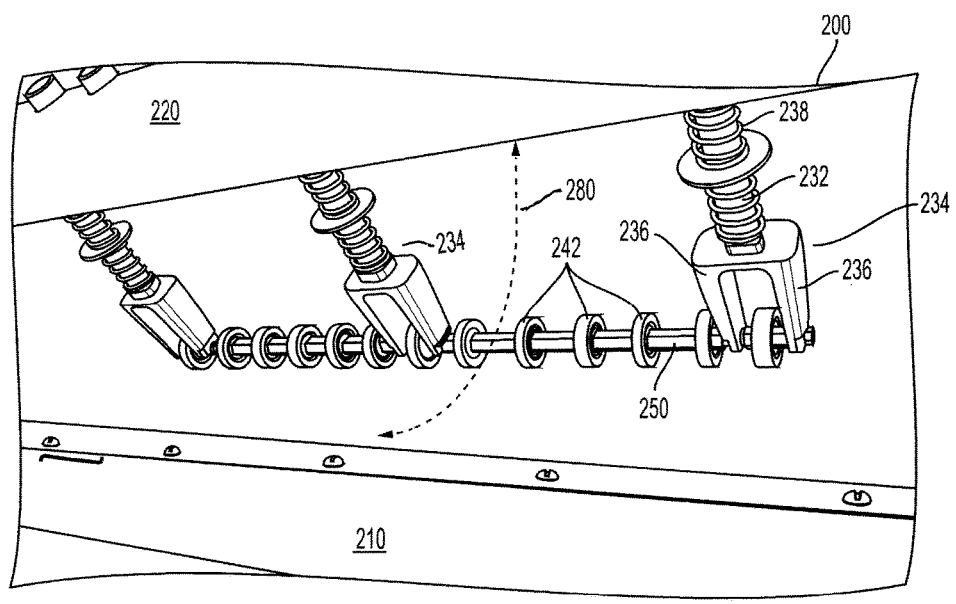
FIG. 3B is another view of the portion of the cleaning device of FIG. 3A.

FIGS. 3A and 3B illustrate a cleaning device 200 according to an embodiment of the invention. The cleaning device 200 includes a trough 210 through which shrimp pass, and an oscillating longitudinal shaft 220 within the trough. The trough 210 may include a liner (not shown) forming a cleaning surface. Alternatively, the trough inner surface may form the cleaning surface. The longitudinal shaft 220 may extend the length of the trough or be shorter than the trough 210, or even longer than the trough. The longitudinal shaft is able to oscillate within the trough. The oscillating shaft 220 has openings 231 for receiving posts of forked roller connectors 234 to connect the oscillating shaft to pinching rollers 242, as described below. The oscillation of the shaft 220 causes the pinching rollers 242 to roll back and forth over a path on the cleaning surface.

The illustrative trough 210 is arcuate in cross-section. The illustrative oscillating shaft 220 extends along and oscillates about an axis that coincides with the axis of curvature of the trough 210, though the invention is not so limited.

A roller assembly comprises a plurality of rollers 242, at least some of which are linked together, so that rotation of one roller induces rotation in a linked roller. The illustrative rollers 242 are mounted on a coupling shaft 250. In the illustrative embodiment, a single coupling shaft 250 extends along the trough and connects all rollers 242, though the invention is not so limited. For example, multiple shafts 250 can be used in various combinations to connected two or more rollers 242 together. Any suitable number and configuration of elements may be used to connect two or more rollers 242 together, directly or indirectly.

Any suitable coupling device for coupling two or more rollers 242 together may be used. For example, a self-aligning coupler, a flexible shaft or other coupling device or series of coupling devices known in the art may be used.

The illustrative coupling shaft 250 is hexagonal in cross-section, though the invention is not so limited. The rollers 242 are mounted on the coupling shaft 250 with a selected spacing between the rollers 242. The spacing between rollers 242 may be consistent or variable. Preferably, the rollers 242 are connected so that rotation of the coupling shaft 250 induces rotation of all connected rollers 242 and vice versa. The spacing between rollers 242 is selected based on the size of the product being cleaned.

In the illustrative embodiment, each roller 242 has a diameter of between about 1.0 inch and about 4.0 inches and preferably about 1.5 inches. The diameter of the rollers may be variable to suit different product sizes or conditions.

The rollers have a width of between about 0.25 and about 0.375 inches, though the invention is not so limited, and the width of the rollers may be varied. Preferably, the width of the wheel is smaller than the inside crescent of a curled shrimp, though the invention is not so limited. The relatively small width allows the roller to reach inside of the crescent of the shrimp to remove legs and other debris from the shrimp.

In one embodiment, the rollers are formed of rubber, such as urethane rubber or peroxide-cured nitrile rubber, though the invention is not so limited.

The rollers 242 can have flat or rounded outer surfaces.

The coupling shaft 250 is connected at selected places to the oscillating shaft 220 via forked roller connectors 234. Each forked roller connector 234 includes prongs 236 that latch onto the coupling shaft 250. The coupling shaft 250 includes journals at periodic locations for mounting the prongs 236 to allow rotation of the coupling shaft 250 relative to the prongs 236. A roller 242 is disposed between each pair of prongs 236, though the invention is not so limited. A post 232 extends from each forked roller connector 234 and is received by the oscillating shaft 220. A spring 238 or other biasing element biases the forked roller connector 234 away from the oscillating shaft 220, which pushes the connected coupling shaft 250 away from the oscillating shaft 220 and biases any mounted rollers 242 into contact with the cleaning surface of the trough.

The invention is not limited to a forked roller connector 234 and any suitable connector for connecting the coupling shaft 250 to the oscillating shaft 220 may be used. For example, the roller connector 234 may lack prongs and simple comprise a post or other device that couples to the coupling shaft 250 at a distal end. The roller connector may be integral with the oscillating shaft 220 or separate from and connected to the oscillating shaft 220.

The cleaning device 200 cleans shrimp by passing the shrimp through the trough 210 from a first end to a second end while the oscillating shaft 220 oscillates back and forth, causing the rollers 242 to sweep back and forth over the cleaning surface along an arced path 280. As the shrimp pass by, the rolling rollers 242 pinch the shrimp between the roller surface and the cleaning surface to remove shell and other debris.

In contrast to prior shrimp cleaning devices, in which the rollers operate independently, the illustrative device 200 links one or more of the rollers 242 via a shaft 250 or other connecting device, so that rotation of one roller causes rotation of the linked roller or rollers. In this manner, when one roller encounters resistance, a linked roller can assist the first roller. In addition, because at least some of the rollers are connected together, each roller 242 does not require a dedicated roller connector to connect the roller 242 to the oscillating shaft 220. Therefore, the number of roller connectors can be reduced and be less than the number of rollers in the cleaning device, in contrast to prior designs, which require a dedicated roller connector for each roller.

Although the invention has been described in detail with reference to a few exemplary versions, other versions are possible. So, as these few examples suggest, the scope of the claims is not meant to be limited to the versions described in detail.

What is claimed is:

1. A cleaning device, comprising:
   a trough extending longitudinally from a first side to a second side and having a cleaning surface;
   an oscillating shaft extending longitudinally through the shaft above the cleaning surface;
   a roller connector extending from the oscillating shaft towards the cleaning surface;
   a coupling shaft connected to the roller connector;
   a first roller mounted on the coupling shaft and contacting the cleaning surface; and
   a second roller mounted on the coupling shaft and contacting the cleaning surface.

2. The cleaning device of claim 1, wherein the roller connector comprises a connecting shaft extending through the oscillating shaft and prongs that attach to the coupling shaft.

3. The cleaning device of claim 2, further comprising a spring mounted on the connecting shaft for biasing the coupling shaft towards the cleaning surface.

4. The cleaning device of claim 1, further comprising a third roller mounted on the coupling shaft and contacting the cleaning surface.

5. The cleaning device of claim 1, wherein the coupling shaft is hexagonal in cross section and includes journals for receiving the roller connector.

6. The cleaning device of claim 1, wherein the coupling shaft is flexible.

7. The cleaning device of claim 1, wherein the first roller and second roller are formed of urethane rubber or peroxide-cured nitrile rubber.

8. A cleaning device, comprising:
   a trough extending longitudinally from a first side to a second side and having a cleaning surface;
   an oscillating shaft extending longitudinally above the cleaning surface;
   a plurality of rollers connected to the oscillating shaft and biased into contact with the cleaning surface; and
   a plurality of roller connectors extending from the oscillating shaft and connecting the plurality of rollers to the oscillating shaft, wherein the number of roller connectors is less than the number of rollers in the cleaning device.

9. The cleaning device of claim 8, further comprising a coupling device for connecting two or more rollers to the roller connector.

10. The cleaning device of claim 9, wherein the coupling device comprising a flexible shaft.

11. The cleaning device of claim 9, wherein the coupling device comprising a self-aligning coupler.

12. The cleaning device of claim 8, wherein each roller connector comprises a lower forked portion for receiving a coupling shaft upon which the rollers are mounted.

13. The cleaning device of claim 8, wherein the rollers are formed of urethane rubber or peroxide-cured nitrile rubber.

14. The cleaning device of claim 13, further comprising a coupling device connecting the first roller to the second roller.

15. The cleaning device of claim 14, further comprising a roller connector for connecting the coupling device to the oscillating shaft.

16. A cleaning device, comprising:
- a trough extending longitudinally from a first side to a second side and having a cleaning surface;
- an oscillating shaft extending longitudinally above the bottom of the trough;
- a first roller coupled to the oscillating shaft and contacting the cleaning surface;
- a second roller connected to the first roller and contacting the cleaning surface.

17. The cleaning device of claim 16, wherein the first roller and second roller are formed of urethane rubber or peroxide-cured nitrile rubber.

* * * * *